(12) United States Patent
Wu et al.

(10) Patent No.: US 12,112,702 B2
(45) Date of Patent: Oct. 8, 2024

(54) DISPLAY DRIVING CIRCUIT, DISPLAY DRIVING METHOD AND DISPLAY PANEL

(71) Applicant: HKC CORPORATION LIMITED, Shenzhen (CN)

(72) Inventors: Kerong Wu, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/350,472

(22) Filed: Jul. 11, 2023

(65) Prior Publication Data

US 2024/0290262 A1  Aug. 29, 2024

(30) Foreign Application Priority Data

Feb. 27, 2023 (CN) .......................... 202310216577.5

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/0233* (2013.01); *G09G 2320/0257* (2013.01); *G09G 2320/045* (2013.01)

(58) Field of Classification Search
CPC ......... G09G 3/3233; G09G 2300/0819; G09G 2300/0842; G09G 2310/08; G09G 2320/0233; G09G 2320/0257; G09G 2320/045

See application file for complete search history.

(56) References Cited

U.S. PATENT DOCUMENTS

2018/0357956 A1* 12/2018 Li .......................... G09G 3/3266

FOREIGN PATENT DOCUMENTS

| CN | 103137067 A | 6/2013 |
| CN | 104282266 A | 1/2015 |

(Continued)

OTHER PUBLICATIONS

CNIPA, First Office Action for CN Application No. 202310216577. 5, Dec. 28, 2023.

(Continued)

*Primary Examiner* — Stephen G Sherman
(74) *Attorney, Agent, or Firm* — Hodgson Russ LLP

(57) ABSTRACT

A display driving circuit includes a driving transistor, a storage circuit, a first reset circuit, a data writing circuit, a compensation circuit and a light-emitting control circuit. The first and second light-emitting control circuits, the driving transistor and the display light-emitting circuit are connected in sequence. The storage circuit is connected to a control terminal of the driving transistor and power supply high voltage terminal, the first reset circuit is connected to the control terminal of the driving transistor, the data writing circuit is connected to a first terminal of the driving transistor, the compensation circuit is connected to the control terminal and a second terminal of the driving transistor, the first and second light-emitting control circuits are used to switch on the power supply high voltage terminal and the display light-emitting circuit in response to first and second scan signals.

3 Claims, 3 Drawing Sheets

(56) References Cited

FOREIGN PATENT DOCUMENTS

| CN | 104465715 A | 3/2015 |
| CN | 104867442 A | 8/2015 |
| CN | 105590955 A | 5/2016 |
| CN | 205541822 U | 8/2016 |
| CN | 107134254 A | 9/2017 |
| CN | 109523956 A | 3/2019 |
| CN | 114758612 A | 7/2022 |

OTHER PUBLICATIONS

CNIPA, Second Office Action for CN Application No. 202310216577.5, Mar. 28, 2024.

* cited by examiner

DISPLAY DRIVING CIRCUIT, DISPLAY DRIVING METHOD AND DISPLAY PANEL

CROSS-REFERENCE TO RELATED APPLICATIONS

This application claims priority to Chinese Patent Application No. 202310216577.5, filed Feb. 27, 2023, the entire disclosures of which are incorporated herein by reference.

TECHNICAL FIELD

The present application relates to the display field, and more particularly, to a display driving circuit, a display driving method and a display panel.

BACKGROUND

OLED (Organic Light-Emitting Diode) display panels have the advantages of being self-luminous, bendable, thin, high brightness, low power consumption, fast response and wide color gamut, and are widely used in electronic products such as TVs, mobile phones and notebooks.

The organic light-emitting diodes (OLED) is driven by current, and the non-uniformity and instability of driving transistors will lead to non-uniformity and afterimage of display of panel. The display driving circuit at least comprises a compensation module and a light-emitting control module, the light-emitting control module controls the light emitting of the organic light-emitting diode, and the compensation module is used for compensating the threshold voltage drift of the driving transistor to improve the non-uniformity and afterimage of display of the panel caused by the non-uniformity of the driving transistor.

SUMMARY

There are provided a display driving circuit, a display driving method and a display panel according to embodiments of the present application. The technical solution is as below:

According to a first aspect of the present application, there is provided a display panel, including a driving transistor, a first terminal of the driving transistor being connected to a power supply high voltage terminal, a second terminal of the driving transistor being connected to a first terminal of a display light-emitting circuit, and a second terminal of the display light-emitting terminal being connected to a power supply low voltage terminal, the display driving circuit further comprises:

a storage circuit connected to a control terminal of the driving transistor and the power supply high voltage terminal, for storing a control terminal voltage of the driving transistor;

a first reset circuit connected to the control terminal of the driving transistor, for writing a reference voltage from a reference voltage terminal in response to a first scan signal and resetting the storage circuit;

a data writing circuit connected to the first terminal of the driving transistor, for writing a data line voltage to the storage circuit in response to a second scan signal;

a compensation circuit connected to the control terminal and the second terminal of the driving transistor, for writing a threshold voltage of the driving transistor to the storage circuit in response to the second scan signal; and a light-emitting control circuit comprising a first light-emitting control circuit connected to the power supply high voltage terminal and the first terminal of the driving transistor for switching on the power supply high voltage terminal and the first terminal of the driving transistor in response to the first scan signal; and a second light-emitting control circuit connected to the second terminal of the driving transistor and the power supply low voltage terminal for switching on the second terminal of the driving transistor and the power supply low voltage terminal in response to the first scan signal and the second scan signal.

According to a second aspect of the present application, there is provided a display driving method, which is used for driving the display driving circuit. The display driving method includes:

in a reset stage, controlling a first scan line to output a low level signal and a second scan line to output a high level signal, and at least writing a reference voltage from a reference voltage terminal to reset a storage circuit;

in a compensation stage, controlling the first scan line to output the high level signal and the second scan line to output the low level signal, and writing a data line voltage to the storage circuit; and in a light-emitting stage, controlling the first scan line to output the high level signal and the second scan line to output the high level signal, and connecting a first terminal of the display light-emitting circuit to a power supply high voltage terminal to drive the display light-emitting circuit to emit light.

According to a third aspect of the present application, there is provided a display panel, which includes:

a display driving circuit; and a display light-emitting circuit connected to a second light-emitting control circuit of the display driving circuit.

It should be understood that the above general description and the following detailed description are exemplary and explanatory only and are not intended to limit the present disclosure.

BRIEF DESCRIPTION OF DRAWINGS

The accompanying drawings, which are incorporated in and constitute a part of the description, illustrate embodiments consistent with the present application and, together with the description, serve to explain the principles of the present application. It will be apparent that the drawings described below are only some embodiments of the present application, and other drawings may be obtained from them without creative effort for those of ordinary skill in the art.

DETAILED DESCRIPTION

The exemplary embodiments will now be described more fully with reference to the accompanying drawings. However, the example embodiments can be implemented in a variety of forms and should not be construed as being limited to the examples set forth herein. Rather, these embodiments are provided so that the present application will be more comprehensive and complete, and the concept of exemplary embodiments will be fully communicated to those skilled in the art.

Further, the described features, structures or characteristics may be incorporated in any suitable manner in one or more embodiments. In the following description many specific details are provided to give a full understanding of the embodiments of the present application. However, those skilled in the art will appreciate that the technical aspects of the present application may be practiced without one or more of the specific details, or other methods, components, devices, steps and the like may be employed. In other instances, the common methods, devices, implementations or operations are not shown or described in detail to avoid obscuring aspects of the present application.

The present application is described in further detail below in conjunction with the accompanying drawings and specific embodiments. It should be noted here that the technical features involved in the various embodiments of the present application described below can be combined with each other as long as they do not conflict with each other. The following embodiments described with reference to the drawings are illustrative and only used to explain the present application, but may not be interpreted as the restrictions of the present application.

Embodiment 1

Figure 1:
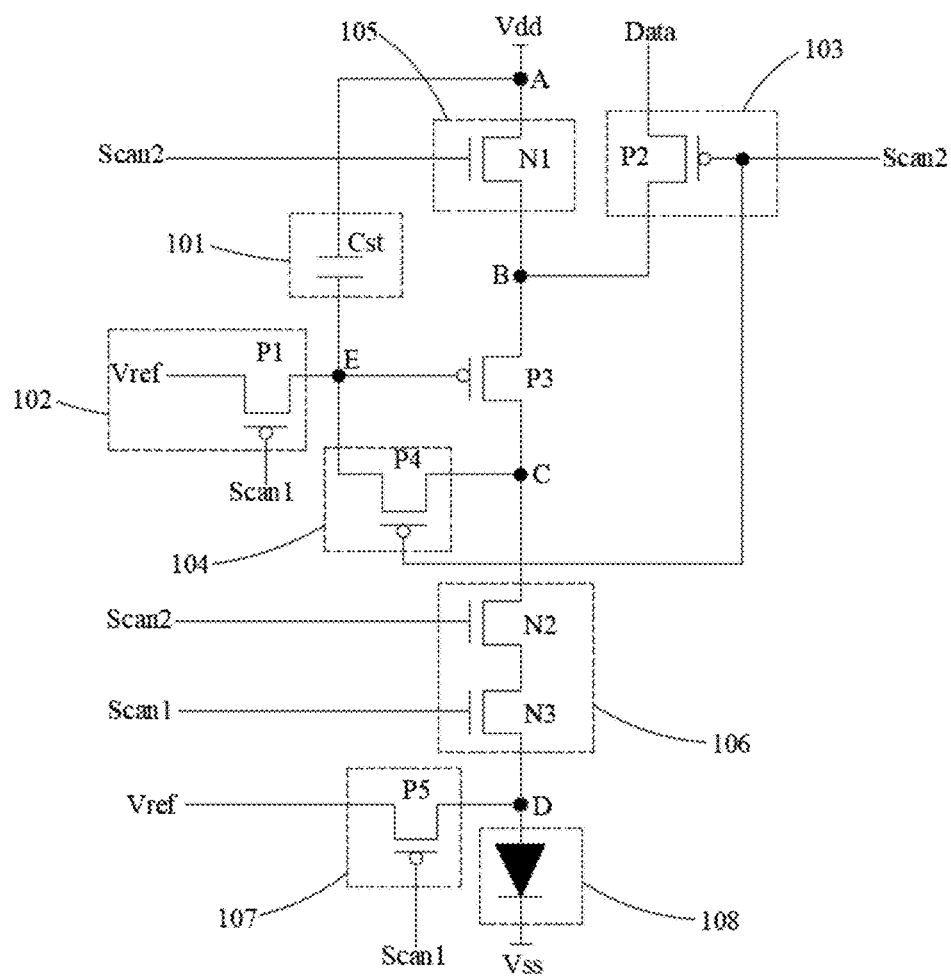
FIG. 1 is a schematic diagram of a display driving circuit in embodiment 1 of the present application.
Figure 2:
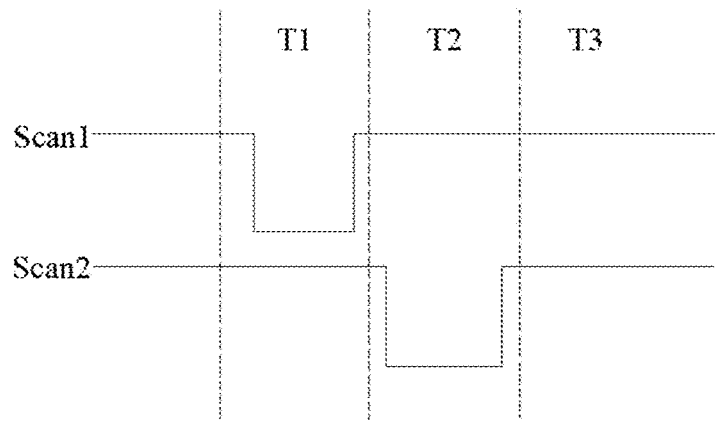
FIG. 2 is a timing diagram of the display drive circuit shown in FIG. 1.

Referring to FIGS. 1 and 2, the display driving circuit in this embodiment includes a driving transistor P3, a storage circuit 101, a first reset circuit 102, a data writing circuit 103, a compensation circuit 104, and a light-emitting control circuit.

A first terminal of the driving transistor P3 is connected to a power supply high voltage terminal Vdd, a second terminal of the driving transistor P3 is connected to a first terminal of the display light-emitting circuit 108, and a second terminal of the display light-emitting circuit 108 is connected to a power supply low voltage terminal Vss. The display light-emitting circuit 108 includes an organic light-emitting diode (OLED), and a first terminal and a second terminal of the display light-emitting circuit 108 are an anode and a cathode of the OLED, respectively.

The storage circuit 101 is connected to the control terminal of the driving transistor P3 and the power supply high voltage terminal Vdd, for storing the control terminal voltage of the driving transistor P3. The storage circuit 101 includes a storage capacitor Cst. The first reset circuit 102 is connected to the control terminal of the driving transistor P3, for writing a reference voltage from a reference voltage terminal Vef in response to a first scan signal and resetting the storage circuit 101. A data writing circuit 103 is connected to the first terminal of the driving transistor P3, for writing a data line voltage to the storage circuit 101 in response to a second scan signal. A compensation circuit 104 is connected to a control terminal and a second terminal of the driving transistor P3, for writing a threshold voltage of the driving transistor P3 to the storage circuit 101 in response to the second scan signal. The first scan signal of the first scan line Scan1 and the second scan signal of the second scan line Scan2 are both generated by a scan signal (GOA Scan) circuit.

The light-emitting control circuit includes a first light-emitting control circuit 105 and a second light-emitting control circuit 106. The first light-emitting control circuit 105 is connected to the power supply high voltage terminal Vdd and the first terminal of the driving transistor P3, for switching on the power supply high voltage terminal Vdd and the first terminal of the driving transistor P3 in response to the second scan signal. The second light-emitting control circuit 106 is connected to the second terminal of the driving transistor P3 and the power supply low voltage terminal Vss, for switching on the second terminal of the driving transistor P3 and the power supply low voltage terminal Vss in response to the first scan signal and the second scan signal.

When the display driving circuit works, in the reset stage T1, the first reset circuit 102 writes the reference voltage from a reference voltage terminal Vref to the storage circuit 101. In the compensation stage T2, the data writing circuit 103 writes the data line Data voltage to the storage circuit 101, and the compensation circuit 104 writes the threshold voltage of the driving transistor P3 to the storage circuit 101, the control terminal voltage of the driving transistor P3 is equal to the data line voltage superimposed on the threshold voltage of the driving transistor P3. In the light-emitting stage T3, the first light-emitting control circuit 105 switches on the power supply high voltage terminal Vdd and the first terminal of the display light-emitting circuit 108. The second light-emitting control circuit 106 switches on the second terminal of the driving transistor P3 and the first terminal of the display light-emitting circuit 108, and the second terminal of the display light-emitting circuit 108 is connected to the power supply low voltage terminal Vss, thereby driving the display light-emitting circuit 108 to emit light.

Since the control terminal voltage of the driving transistor P3 is equal to the data line voltage superimposed on the threshold voltage of the driving transistor P3, when the display light-emitting circuit 108 is driven to emit light, the driving current of the display light-emitting circuit 108 is independent of the threshold voltage of the driving transistor P3 in the compensation stage T2, and the problem of uniform display caused by the threshold voltage drift of the driving transistor P3 can be avoided.

In some technical solutions, the light-emitting control circuit is controlled by the light-emitting control signal of the light-emitting control signal circuit, and the GOA circuit of the display panel needs to include both the light-emitting control signal circuit and the scan signal circuit, so the GOA circuit occupies a large space of the display panel.

In the present application, the driving transistor P3 is connected to the display light-emitting circuit 108, the storage circuit 101 is connected to the control terminal of the driving transistor P3 and the power supply high voltage terminal Vdd, the first reset circuit 102 is connected to the control terminal of the driving transistor P3 to reset the storage circuit 101 in response to the first scan signal, the data writing circuit 103 is used to write the data line voltage to the storage circuit 101 in response to the second scan signal, the compensation circuit 104 is used to write the threshold voltage of the driving transistor P3 to the storage circuit 101 in response to the second scan signal, the first light-emitting control circuit 105 is used to switch on the power supply high voltage terminal Vdd and the first terminal of the driving transistor P3 in response to the first scan signal, and the second light-emitting control circuit 106 is used to switch on the second terminal of the driving transistor P3 and the power supply low voltage terminal Vss in response to the first scan signal and the second scan signal. Compared with the technical solution of controlling the light-emitting control circuit through the light-emitting control signal circuit, the light-emitting control circuit is controlled by multiplexing signals from the scanning signal circuit according to the present application, so that a light-emitting control signal circuit of the GOA circuit can be omitted, the space occupied by the GOA circuit on the display panel is reduced, and the bezel of the display panel can be designed to be narrower.

As an example, as shown in FIGS. 1 and 2, the first light-emitting control circuit 105 includes a first N-type thin film transistor N1, a first terminal of the first N-type thin film transistor N1 is connected to the power supply high voltage terminal Vdd through a first node A, a second terminal of the first N-type thin film transistor N1 is connected to the first terminal of the drive transistor P3 through a second node B, and a control terminal of the first N-type thin film transistor N1 is connected to the second scan line Scan2.

When the display driving circuit operates, the first light-emitting control circuit 105 switches on the power supply high voltage terminal Vdd and the first terminal of the driving transistor P3 in the reset stage T1 and the light-emitting stage T3, and the first light-emitting control circuit 105 switches off the power supply high voltage terminal Vdd and the first terminal of the driving transistor P3 in the compensation stage T2.

In the reset stage T1, the first scan signal is a low level signal, and the second scan signal is a high level signal. In the compensation stage T2, the first scan signal is a high level signal, and the second scan signal is a low level signal. In the light-emitting stage T3, the first scan signal is a high level signal, and the second scan signal is a high level signal. When the first light-emitting control circuit 105 is the first N-type thin film transistor N1, the first N-type thin film transistor N1 is switched on in the reset stage T1 and the light-emitting stage T3, and is switched off in the compensation stage T2.

When the first light-emitting control circuit 105 is the first N-type thin film transistor N1, the second scan signal can be multiplexed instead of the light-emitting control signal to control the first N-type thin film transistor N1 to be switched on in the reset stage T1 and the light-emitting stage T3 and switched off in the compensation stage T2, thereby achieving the function of the first light-emitting control circuit 105, and the light-emitting control signal circuit of the GOA circuit can be omitted.

Referring to FIGS. 1 and 2, the second light-emitting control circuit 106 includes a second N-type thin film transistor N2 and a third N-type thin film transistor N3. A first terminal of the second N-type thin film transistor N2 is connected to the second terminal of the driving 20) transistor P3 through a third node C, and a second terminal of the second N-type thin film transistor N2 is connected to a first terminal of the third N-type thin film transistor N3, and a control terminal of the second N-type thin film transistor N2 is connected to the second scan line Scan2. A second terminal of the third N-type thin film transistor N3 is connected to the first terminal of the display light-emitting circuit 108 through a fourth node D, and a control terminal of the third N-type thin film transistor N3 is connected to the first scan line Scan1.

When the display driving circuit operates, the second light-emitting control circuit 106 switches off the second terminal of the driving transistor P3 and the power supply low voltage terminal Vss in the reset stage T1 and the compensation stage T2, and the second light-emitting control circuit 106 switches on the second terminal of the driving transistor P3 and the power supply low voltage terminal Vss in the light-emitting stage T3.

When the second light-emitting control circuit 106 is the second N-type thin film transistor N2 and the third N-type thin film transistor N3 connected to each other, it is possible to multiplex the first scan line Scan1 to control the third N-type thin film transistor N3, and multiplex the second scan line Scan2 to control the second N-type thin film transistor N2, thereby achieving the function of the second light-emitting control circuit 106, and the light-emitting control signal circuit of the GOA circuit can be omitted.

Referring to FIGS. 1 and 2, the first reset circuit 102 includes a first P-type thin film transistor P1, a first terminal of the first P-type thin film transistor P1 is connected to the reference voltage terminal Vref, the second terminal of the first P-type thin film transistor P1 is connected to the control terminal of the driving transistor P3 through a fifth node E, and the control terminal of the first P-type thin film transistor P1 is connected to the first scan line Scan1.

In the reset stage T1, the first scan line Scan signal is a low level signal, the first P-type thin film transistor P1 is switched on in response to the first scan signal, and the reference voltage is written to reset the fifth node E.

When the first reset circuit 102 is the first P-type thin film transistor P1, the first P-type thin film transistor P1 is switched on in response to the first scan signal, and the reference voltage is reset to the fifth node E, so as to clear the charge stored in the storage circuit 101 and avoid the residual charge displayed in the previous frame affecting the display of the next frame of the display light-emitting circuit 108.

Referring to FIGS. 1 and 2, the data writing circuit 103 includes a second P-type thin film transistor P2, a first terminal of the second P-type thin film transistor P2 is connected to the data line Data. The second terminal of the second P-type thin film transistor P2 is connected to the first terminal of the driving transistor P3 through the second node B, and the control terminal of the second P-type thin film transistor P2 is connected to the second scan line Scan2.

When the data writing circuit 103 is the second P-type thin film transistor P2, in the compensation stage T2, the second scan signal is a low level signal, the second P-type thin film 20) transistor P2 is switched on in response to the second scan signal, the data line voltage is written to the fifth node E and stored in the storage circuit 101, and in the light-emitting stage T3, the display light-emitting circuit 108 displays according to the data line Data.

Referring to FIGS. 1 and 2, the compensation circuit 104 includes a fourth P-type thin film transistor P4, the first terminal of the fourth P-type thin film transistor P4 is connected to the second terminal of the driving transistor P3 through the third node C, the second terminal of the fourth P-type thin film transistor P4 is connected to the control terminal of the driving transistor P3 through the fifth node E, and the control terminal of the fourth P-type thin film transistor P4 is connected to the second scan line Scan2. The display driving circuit also includes a third P-type thin film transistor, and the third P-type thin film transistor is the driving transistor P3.

When the compensation circuit 104 is the fourth P-type thin film transistor P4, the second scan signal is a low level signal in the compensation stage, the fourth P-type thin film transistor P4 is switched on in response to the second scan signal, the fourth P-type thin film transistor P4 captures the threshold voltage of the driving transistor P3 and superimposes it on the data line voltage and stores in the storage circuit 101, when the display light-emitting circuit 108 is driven to emit light, the driving current of the display light-emitting circuit 108 is independent of the threshold voltage of the driving transistor P3 in the compensation stage T2, and the problem of uneven display caused by the threshold voltage drift of the driving transistor P3 can be avoided.

Referring to FIGS. 1 and 2, the display driving circuit further includes a second reset circuit 107. The second reset circuit 107 is connected to a first terminal of the display light-emitting circuit 108 through the fourth node D, for resetting the display light-emitting circuit 108 in response to the first scan signal.

The second reset circuit 107 resets the display light-emitting circuit 108 by clearing the residual charge of the fourth node D in response to the first scan signal, so as to prevent the residual charge displayed in the previous frame from affecting the display of the display light-emitting circuit 108 in the next frame.

Referring to FIGS. 1 and 2, the second reset circuit 107 includes a fifth P-type thin film transistor P5, the first terminal of the fifth P-type thin film transistor P5 is connected to the reference voltage terminal Vref, the second terminal of the fifth P-type thin film transistor P5 is connected to the first terminal of the display light-emitting circuit 108 through the fourth node D, and the control terminal of the fifth P-type thin film transistor P5 is connected to the first scan line Scan1.

When the second reset circuit 107 is the fifth P-type thin film transistor P5, in the reset stage T1, the first scan signal is a low level signal, the fifth P-type thin film transistor P5 is switched on in response to the first scan signal, and the reference voltage resets the display light-emitting circuit 108 to avoid the residual charge displayed in the previous frame affecting the display light-emitting circuit 108 to display in the next frame.

It should be noted that the first light-emitting control circuit 105 may be the first N-type thin film transistor N1, the second light-emitting control circuit 106 may be the second N-type thin film transistor N2 and the third N-type thin film transistor N3, the first reset circuit 102 may be the first P-type thin film transistor P1, the data writing circuit 103 may include the second P-type thin film transistor P2, the compensation circuit 104 may include the fourth P-type thin film transistor P4, and the second reset circuit 107 may be the fifth P-type thin film transistor P5, but not limited thereto. The first light-emitting control circuit 105 and the second light-emitting control circuit 106 may also be P-type thin film transistors, and the first reset circuit 102, the data writing circuit 103, the compensation circuit 104 and the second reset circuit 107 may also be N-type thin film transistors, as the case may be.

When the first light-emitting control circuit 105 and the second light-emitting control circuit 106 are respectively P-type thin film transistors, and the first reset circuit 102, the data writing circuit 103, the compensation circuit 104 and the second reset circuit 107 are respectively N-type thin film transistors, the timing of the first scan signal and the second scan signal are adjusted accordingly.

Embodiment 2

Figure 3:
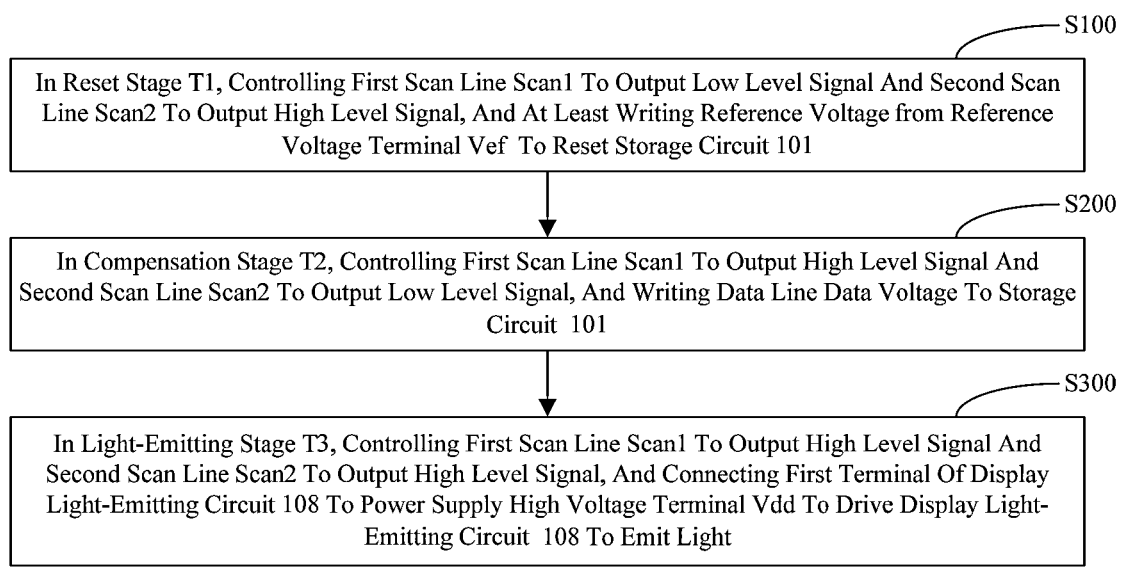
FIG. 3 is a flowchart of a display driving method in embodiment 2 of the present application.

The display driving method is used for driving the display driving circuit in embodiment 1, as shown in FIG. 3. The display driving method includes:

S100: in a reset stage T1, controlling first scan line Scan1 to output a low level signal and a second scan line Scan2 to output a high level signal, and at least writing a reference voltage from a reference voltage terminal Vef to the reset storage circuit 101;

S200: in a compensation stage T2, controlling the first scan line Scan1 to output the high level signal and the second scan line Scan2 to output the low level signal, and writing a data line voltage to the storage circuit 101; and S300: in a light-emitting stage T3, controlling the first scan line Scan1 to output the high level signal and the second scan line Scan2 to output the high level signal, and connecting a first terminal of the display light-emitting circuit 108 to a power supply high voltage terminal Vdd to drive the display light-emitting circuit 108 to emit light.

In this embodiment, in the reset stage T1, the first scan line Scan1 outputs a low level signal and the second scan line Scan2 outputs a high level signal, and the reference voltage is written to reset the storage circuit 101. In the compensation stage T2, the first scan line Scan1 outputs a high level signal and the second scan line Scan2 outputs a low level signal, and the data line voltage is written to the storage circuit 101. At the same time, the compensation circuit 104 captures the threshold voltage of the driving transistor P3 and superimposes it on the storage circuit 101. In the light-emitting stage T3, both the first scan line Scan1 and the second scan line Scan2 output a high level signal, the first light-emitting control circuit 105 switches on the power supply high voltage terminal Vdd and the first terminal of the driving transistor 20) P3 in response to the first scan signal, and the second light-emitting control circuit 106 switches on the second terminal of the driving transistor P3 and the power supply low voltage terminal Vss in response to the first scan signal and the second scan signal. The light-emitting control circuit is controlled by multiplexing the scanning signals of the scanning signal circuit, so that a light-emitting control signal circuit of the GOA circuit can be omitted, the space occupied by the GOA circuit on the display panel is reduced, and the bezel of the display panel can be designed to be narrower.

Embodiment 3

Figure 4:
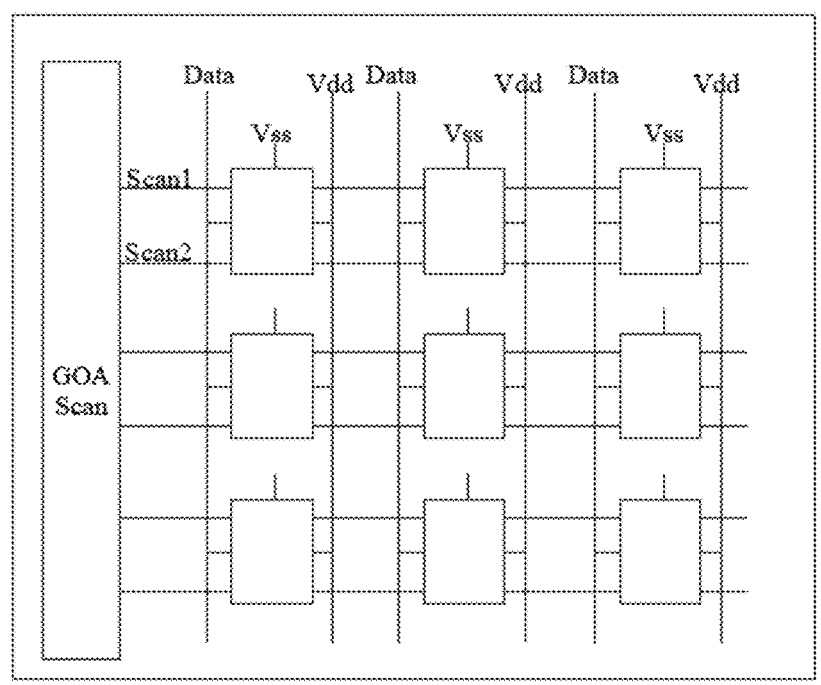
FIG. 4 is a schematic structural diagram of a display panel in embodiment 3 of the present application.

Referring to FIG. 4, the display panel in this embodiment includes the display driving circuit in the embodiment 1. The display panel further includes a GOA circuit, a first scan line 30) Scan1, a second scan line Scan2, a data line Data and a display light-emitting circuit 108. A plurality of rows of first scan lines Scan1, a plurality of rows of second scan lines Scan2, and a plurality of columns of data lines Data are provided in a display area of a display panel. The display driving circuit and the display light-emitting circuit 108 are provided at intersections of the data lines Data and the scan lines. The GOA circuit includes a scan signal circuit provided in a non-display area on the display area side, and the scan signal circuit is connected to the first scan line Scan1 and the second scan line Scan2.

In this embodiment, the display panel comprises a display driving circuit, the display driving circuit controls the light-emitting control circuit by multiplexing the scanning signals of the scan signal circuit, the light-emitting control signal circuit of the GOA circuit can be omitted, the space of the display panel occupied by the GOA circuit is reduced, and the bezel of the display panel can be designed to be narrower.

The terms of "first," "second" and the like are for descriptive purposes only and cannot be construed as indicating or implying relative importance or implying the number of the indicated technical features. Thus, features defined with "first", "second" and the like may explicitly or implicitly include one or more of the features. In the description of the present application, "multiple" means two or more unless otherwise expressly specified.

In the present application, unless otherwise explicitly provided and limited, the terms such as "mount," "connect," should be understood broadly, which, for example, may refer to a fixed connection, a detachable connection, or an integral connection: which may refer to a mechanical connection or an electrical connection: which may refer to a direct connection or an indirect connection via an intermediate medium: which may also refer to a communication between the insides of two elements. For those ordinarily skilled in the art, the specific meanings of the above terms in the present application will be understood according to the specific circumstances.

In the content of the description, illustrations of the reference terms "some embodiments," "example," etc. mean that specific features, structures, materials, or characteristics described in connection with the embodiment or example are encompassed in at least one embodiment or example of the present application. In this description, the schematic formulation of the above terms need not be directed to the same embodiments or examples. Further, the specific features, structures, materials or characteristics described may be combined in a suitable manner in any one or more embodiments or examples. Further, without contradicting one another, those skilled in the art may combine and incorporate different embodiments or examples described in the description and features of different embodiments or examples.

Although embodiments of the present application have been shown and described above, it will be understood that the above-mentioned embodiments are exemplary and cannot be construed as limiting the present application. Those of ordinary skill in the art may make changes, variations, alternatives and modifications to the above-mentioned embodiments within the scope of the present application. Therefore, any changes or modifications made in accordance with the claims and descriptions of the present application should fall within the scope of the patent of the present application.

What is claimed is:

1. A display driving method for driving a display driving circuit, wherein the display driving circuit comprises a driving transistor, a first terminal of the driving transistor being connected to a power supply high voltage terminal, a second terminal of the driving transistor being connected to a first terminal of a display light-emitting circuit, and a second terminal of the display light-emitting terminal being connected to a power supply low voltage terminal, a storage circuit connected to a control terminal of the driving transistor and the power supply high voltage terminal, for storing a control terminal voltage of the driving transistor, a first reset circuit connected to the control terminal of the driving transistor, for writing a reference voltage from a reference voltage terminal in response to a first scan signal and resetting the storage circuit, a data writing circuit connected to the first terminal of the driving transistor, for writing a data line voltage to the storage circuit in response to a second scan signal, a compensation circuit connected to the control terminal and the second terminal of the driving transistor, for writing a threshold voltage of the driving transistor to the storage circuit in response to the second scan signal; and a light-emitting control circuit comprising a first light-emitting control circuit connected to the power supply high voltage terminal and the first terminal of the driving transistor for switching on the power supply high voltage terminal and the first terminal of the driving transistor in response to the first scan signal; and a second light-emitting control circuit connected to the second terminal of the driving transistor and the power supply low voltage terminal for switching on the second terminal of the driving transistor and the power supply low voltage terminal in response to the first scan signal and the second scan signal, wherein the display driving method comprises:

in a reset stage, controlling a first scan line to output a low level signal and a second scan line to output a high level signal, and at least writing a reference voltage from a reference voltage terminal to reset a storage circuit;

in a compensation stage, controlling the first scan line to output the high level signal and the second scan line to output the low level signal, and writing a data line voltage to the storage circuit; and in a light-emitting stage, controlling the first scan line to output the high level signal and the second scan line to output the high level signal, and connecting a first terminal of the display light-emitting circuit to a power supply high voltage terminal to drive the display light-emitting circuit to emit light.

2. The display driving method according to claim 1, wherein the first light-emitting control circuit comprises a first N-type thin film transistor, a first terminal of the first N-type thin film transistor being connected to the power supply high voltage terminal, a second terminal of the first N-type thin film transistor being connected to the first terminal of the driving transistor, and a control terminal of the first N-type thin film transistor being connected to a second scan line.

3. The display driving method according to claim 2, wherein the second light-emitting control circuit comprises a second N-type thin film transistor and a third N-type thin film transistor, wherein a first terminal of the second N-type thin film transistor is connected to the second terminal of the driving transistor, a second terminal of the second N-type thin film transistor is connected to a first terminal of the third N-type thin film transistor, and a control terminal of the second N-type thin film transistor is connected to the second scan line; and wherein a second terminal of the third N-type thin film transistor is connected to a first terminal of the display light-emitting circuit, and a control terminal of the third N-type thin film transistor is connected to a first scan line.

* * * * *